US006835314B2

United States Patent
Keller et al.

(10) Patent No.: US 6,835,314 B2
(45) Date of Patent: Dec. 28, 2004

(54) METHOD AND APPARATUS FOR REMEDIATING WASTEWATER HOLDING AREAS AND THE LIKE

(75) Inventors: Robert A. Keller, Hart, MI (US); William J. Cretens, Grand Rapids, MI (US); Kent T. Depuydt, Ada, MI (US); Dana J. Trierweiler, Rockford, MI (US); Russell D. Johnson, Grand Rapids, MI (US); Dean R. Wickoren, Paola, KS (US)

(73) Assignee: Infrastructure Alternatives, Comstock, MI (US)

(*) Notice: Subject to any disclaimer, the term of this patent is extended or adjusted under 35 U.S.C. 154(b) by 0 days.

(21) Appl. No.: 10/093,690

(22) Filed: Mar. 8, 2002

(65) Prior Publication Data
US 2003/0062319 A1 Apr. 3, 2003

(Under 37 CFR 1.47)

(51) Int. Cl.[7] ............................................... C02F 11/14
(52) U.S. Cl. ................... 210/710; 210/732; 210/747; 210/770; 405/52; 37/318
(58) Field of Search ......................... 210/710, 712, 210/732, 747, 770, 803, 805, 170; 405/36, 52; 37/318

(56) References Cited

U.S. PATENT DOCUMENTS

| | | |
|---|---|---|
| 3,399,778 A | 9/1968 | O'Neill |
| 3,705,851 A | 12/1972 | Brauer |
| 3,796,658 A | 3/1974 | Meissner, Sr. |
| 3,975,266 A | 8/1976 | Baize |
| 4,260,496 A | 4/1981 | Beer |
| 4,312,762 A | 1/1982 | Blackburn et al. |
| 4,333,835 A | 6/1982 | Lynch |
| 4,518,507 A | 5/1985 | Conner |
| 4,541,927 A | 9/1985 | Breidenbaugh |
| 4,555,201 A | 11/1985 | Paoluccio |
| 4,584,099 A | 4/1986 | Burton |
| 4,681,688 A | 7/1987 | Sondov et al. |
| 4,818,390 A | 4/1989 | Manchak, Jr. |
| 4,854,058 A | 8/1989 | Sloan et al. |
| 4,929,353 A | 5/1990 | Harris |
| 5,167,841 A * | 12/1992 | Mims .......................... 210/805 |
| 5,202,034 A * | 4/1993 | Martel, Jr. ................... 210/770 |
| 5,302,295 A * | 4/1994 | Kellogg et al. .............. 210/710 |
| 5,439,598 A | 8/1995 | Clough |
| 5,490,920 A * | 2/1996 | Fruchtbaum et al. ....... 210/527 |
| 5,573,349 A | 11/1996 | Paoluccio |
| 5,575,921 A | 11/1996 | Askin et al. |
| 5,656,174 A | 8/1997 | Hodges et al. |
| 5,660,055 A * | 8/1997 | Eriksson ...................... 210/747 |
| 5,720,885 A | 2/1998 | Moos |
| 5,810,510 A * | 9/1998 | Urriola ......................... 405/36 |
| 5,938,936 A | 8/1999 | Hodges et al. |
| 5,948,250 A | 9/1999 | Middleton |
| 6,096,228 A * | 8/2000 | Angelle ........................ 210/803 |
| 6,146,540 A | 11/2000 | Nakamura et al. |
| 6,149,811 A | 11/2000 | Hodges et al. |
| 6,168,710 B1 | 1/2001 | Martinez Mugica |
| 6,170,514 B1 | 1/2001 | Esmailzadeh |
| 6,258,274 B1 * | 7/2001 | Wu .............................. 210/747 |
| 6,345,672 B1 * | 2/2002 | Dietzen ......................... 175/66 |

FOREIGN PATENT DOCUMENTS

| | | |
|---|---|---|
| DE | 2009155 | 9/1970 |
| DE | 2331118 | 1/1975 |
| GB | 1372827 | 11/1974 |

* cited by examiner

Primary Examiner—Christopher Upton
(74) Attorney, Agent, or Firm—Price, Heneveld, Cooper, DeWitt & Litton, LLP

(57) ABSTRACT

A method and apparatus for remediating wastewater holding areas and the like includes a closed, foraminous dewatering membrane that is positioned adjacent to the wastewater holding area. Sludge and adjacent water on the bottom of the wastewater holding area are pumped in the form of a sludge slurry into the interior of the dewatering membrane. The water is removed from the sludge slurry by allowing gravitational forces to flow water through the dewatering membrane. The dewatering membrane is then opened, and the dewatered sludge is removed for depositing at an appropriate site.

21 Claims, 2 Drawing Sheets

METHOD AND APPARATUS FOR REMEDIATING WASTEWATER HOLDING AREAS AND THE LIKE

BACKGROUND OF THE INVENTION

The present invention relates to water treatment, and in particular to a method and apparatus for remediating wastewater holding areas and the like.

There have been developed over the years many different systems and devices for remediating wastewater holding areas, such as lagoons, ponds, holding vessels, basins, and other similar structures. Because of ecological considerations, research and development for feasible and economical solutions for cleaning up or remediating wastewater and other types of contaminated water have been greatly accelerated.

The modern treatment of domestic wastewater through biological means results in a residual byproduct comprised mostly of bacterial cell material and inert debris. A common practice in the treatment of domestic wastewater is to utilize large holding vessels, also known as lagoons, to provide the necessary detention time and environmental conditions to complete the treatment process. Clear liquid effluent is decanted from the treatment zone on a periodic basis, thereby leaving solid residuals as a settled sludge in the lower portion of the lagoon. Over time, the sludge accumulates, necessitating periodic removal. The sludge, which typically settles at the bottom of the lagoon, does not normally behave as a fluid, but rather resembles a heavy viscous or soft gelatinous material. It has been found that when a conventional pump is used to remove sludge from a retention area, the pump normally removes only a small area or portion of the sludge, such that complete remediation of the lagoon is difficult due to the unique characteristics of the sludge.

A number of different approaches have been utilized in the prior art for remediating wastewater holding areas and/or dewatering sludge. One such method comprises removing the surface water from the lagoon and dewatering the sludge through evaporation on an open drying bed prior to removal to a dumpsite. However, such processes are relatively invasive, and not environmentally sensitive to the adjacent area. Furthermore, the remediation process removes the lagoon from service, and undesirable odors often result from the long drying process, which typically requires turning over the sludge to achieve additional drying. Such methods also are not particularly effective in thoroughly drying the sludge to achieve a minimum volume, so as to facilitate removal and deposit of the dewatered sludge.

Other prior art dewatering sludge processes include utilizing belt presses, filter presses, centrifuges and sludge drying beds. The various sludge press and centrifuge systems are expensive to purchase, operate and maintain.

Consequently, a need exists for a cost effective, environmentally sensitive technique to remediate wastewater holding areas and the like in a non-intrusive manner, while keeping the lagoon in service.

SUMMARY OF THE INVENTION

One aspect of the present invention is a method for remediating wastewater holding areas and the like of the type having a bottom with sludge deposited thereon, and water over the sludge which defines an upper surface of an associated lagoon. The method includes forming a closed foraminous dewatering membrane configured to dewater sludge slurry therein. The dewatering membrane is positioned adjacent to the wastewater holding area at an elevation above the elevation of the upper surface of the lagoon. Sludge and adjacent water from the bottom of the lagoon are pumped in the form of a sludge slurry into the interior of the dewatering membrane. Water is removed from the sludge slurry by allowing gravitational forces to flow water through the dewatering membrane back into the lagoon. The dewatering membrane is then opened, and the dewatered sludge is removed for deposit at an appropriate site.

Another aspect of the present invention is a method for removing sludge from water holding areas and the like, comprising the steps of forming a closed foraminous watering membrane configured to dewater a sludge slurry therein. The dewatering membrane is positioned adjacent to a water holding area. Sludge and adjacent water from the bottom of the water holding area are pumped in the form of a sludge slurry into the interior of the dewatering membrane. The water is removed from the sludge slurry by allowing gravitational forces to flow water through the dewatering membrane. The dewatering membrane is then opened, and the dewatered sludge removed for deposit at an appropriate site.

Yet another aspect of the present invention is an apparatus for removing sludge from wastewater holding areas and the like, comprising a cutter head adapted to be positioned adjacent to the bottom of a wastewater holding area and configured to draw therethrough sludge and adjacent water in the form of a sludge slurry. The apparatus also includes a dewatering membrane having a closed interior with a foraminous construction adapted to dewater sludge slurry deposited therein. A pump is operably connected with the cutter head and the dewatering membrane, whereby sludge slurry is drawn from the bottom of the wastewater holding area and is transported into the interior of the dewatering membrane, whereby gravitational forces flow water in the sludge slurry through the dewatering membrane to create a dewatered sludge which can be transported in generally solid form to an appropriate site.

The present invention provides a cost effective, timesaving and environmentally sensitive method and apparatus for treating water, including removing sludge from wastewater holding areas and the like. The present method and apparatus permit the water holding area to be treated, without removing the same from service, thereby resulting in substantial cost savings. Minimum impact to the surrounding environments, reduced odor, and improved drying to minimize dewatered sludge removal are also aspects of the present invention.

These and other advantages of the invention will be further understood and appreciated by those skilled in the art by reference to the following written specification, claims and appended drawings.

DETAINED DESCRIPTION OF THE PREFERRED EMBODIMENTS

Figure 1:
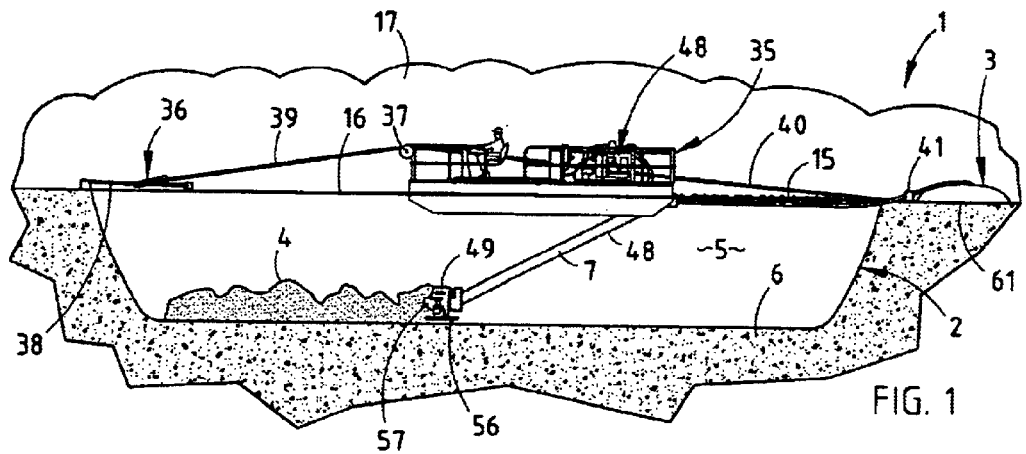
FIG. 1 is a schematic, vertical cross-sectional view of an apparatus embodying the present invention.
Figure 2:
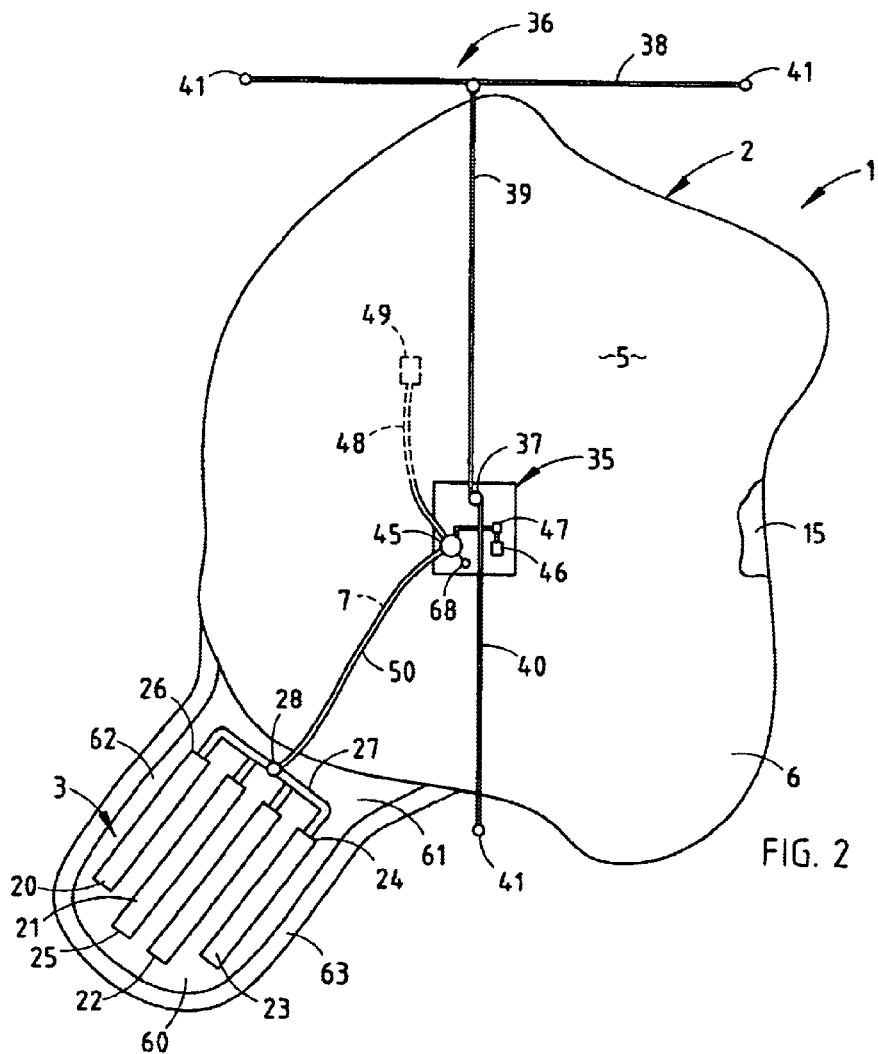
FIG. 2 is a schematic, top plan view of the apparatus shown in FIG. 1.
Figure 3:
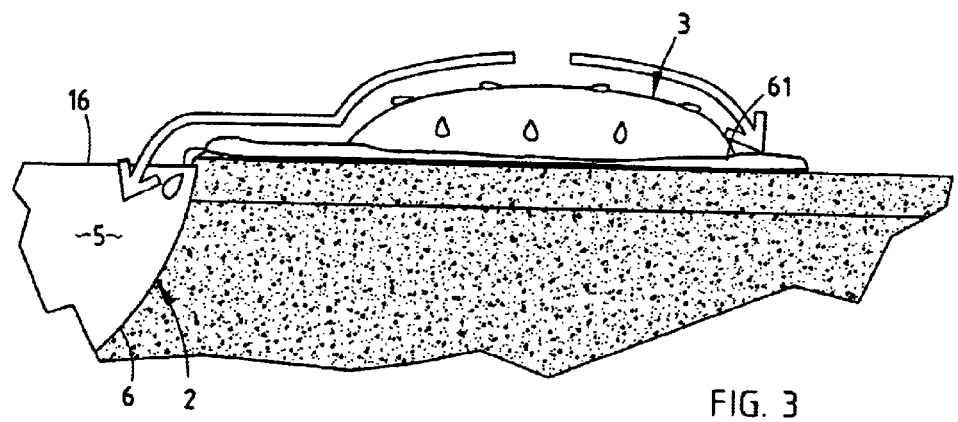
FIG. 3 is a schematic, vertical cross-sectional view of a dewatering membrane portion of the present invention, showing dewatering sludge.

For purposes of description herein the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
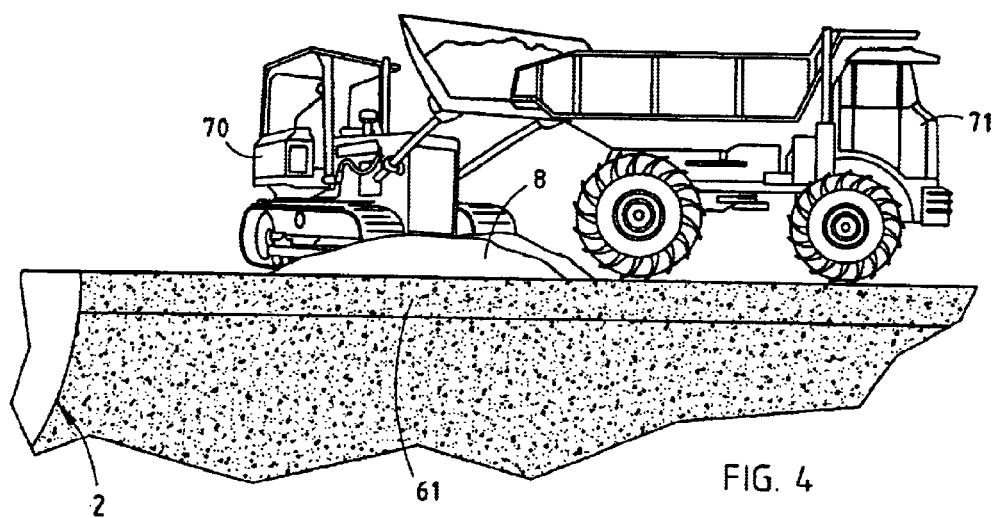
FIG. 4 is a schematic, vertical cross-sectional view of a wastewater holding area, showing removal of the dewatered sludge.

The reference numeral 1 (FIGS. 1–2) generally designates an apparatus for remediating water holding areas and the like, such as the illustrated pond or lagoon 2. Apparatus 1 includes at least one closed foraminous dewatering membrane 3 that is positioned adjacent to lagoon 2. Sludge 4 and adjacent water 5 on the bottom 6 of lagoon 2 are pumped in the form of a sludge slurry 7 into the interior of dewatering membrane 3. The water 5 is removed from the sludge slurry 7 by allowing gravitational forces to flow water 5 through the dewatering membrane 3. The dewatering membrane 3 is then opened, and the dewatered sludge 8 (FIG. 4) is removed for deposit at an appropriate site.

In the illustrated example, apparatus 1 is shown in conjunction with a pond or lagoon 2 of the type which can be either natural or manmade. The illustrated manmade lagoon 2 is provided with a flexible imperforate liner 15, constructed from polyethylene or the like, extending along the bottom 6 thereof, which ensures that the wastewater will not seep into the surrounding ground soil. Alternatively, lagoon 2 can be carved from or lined with clay to achieve a similar result. In either case, lagoon 2 is formed of a sufficient depth to maintain sludge 4 in a fully submersed condition below the upper surface 16 of lagoon 2. An earthen berm 17 may be formed around the perimeter of lagoon 2 to ensure that the wastewater is retained therein.

The illustrated dewatering membrane 3 has a semipermeable or foraminous construction which permits water to flow therethrough, while retaining sludge and other solid debris. In the example illustrated in FIG. 2, dewatering membrane 3 comprises a plurality of elongate cylinders or tubes 20–23 which are constructed from a suitable geotextile material, such as fabric woven from black synthetic fibers. Geotextile tubes 20–23 have closed opposite ends 24 and 25, and at least one inlet port 26 to facilitate injecting sludge slurry into the interior of dewatering membrane 3, as described in greater detail hereinafter. In the illustrated example, a header 27 is connected with each of the inlet ports 26, and includes a valve 28 to direct sludge slurry into preselected ones of the geotextile tubes 20–23. The illustrated tubes 20–23 are generally cylindrical or pillow-like in shape, and can be easily formed by folding a large sheet of geotextile material over itself and stitching together the open ends and edges.

The illustrated apparatus 1 also includes a floating barge or dredge 35, which has a substantially conventional construction, and is adapted to be shifted over the surface of lagoon 2, so as to easily access all portions of the bottom 6 of lagoon 2. In the illustrated example, bi-directional rigging 36 is operably attached to a motorized capstan 37 mounted on floating dredge 35 to maneuver floating dredge 35 over the surface 16 of lagoon 2. Rigging 36 includes a series of movable steel wire cables or lines 38–40, which have their ends connected with the ground adjacent lagoon 2 by ground anchors 41. Rotation of capstan 37 shifts floating dredge 35 from one side of lagoon 2 to the other. Cable jacks (not shown) may be used to shift floating dredge 35 laterally on line 38 across the width of lagoon 2.

A sludge pump 45 is provided to suck the sludge 4 and adjacent water 5 from the lower extremities or bottom 6 of lagoon 2. In the illustrated example, pump 45 is a piston pump that is hydraulically powered or driven by an internal combustion engine 46 and a hydraulic pump 47, all of which are supported on floating dredge 35. Preferably, hydraulic pump 47 is used to power capstan 37, as well as sludge pump 45. A submerged conduit or tube 48 is attached to the inlet side of pump 45, and has its opposite end attached to a cutter head 49. A flexible floating conduit or tube 50 is attached to the outlet side of pump 45, and has its opposite end attached to header 27. Preferably, pump 45 is capable of pumping solids up to a diameter of four to six inches.

Cutter head 49, which is operably connected with the inlet end of tube 48, is adapted to be positioned in the lower extremities of lagoon 2, adjacent to the lagoon bottom 6, and is configured to draw therethrough sludge 4 and adjacent water 5, mixing the same in the form of a sludge slurry 7. Preferably, cutter head 49 includes self-adjusting skids 56 which serve to position cutter head 49 a predetermined distance above the bottom 6 of lagoon 2, so as to completely remove sludge 4, without damaging liner 15, or the surface of the bottom 6. Cutter head 49 also preferably includes a rotator, or other form of agitator 57, which assists in dislodging and removing sludge 4 from the bottom 6 of lagoon 2, and mixing the same with the adjacent water 5 to form sludge slurry 7. Cutter head 49 is moved across the bottom 6 of in lagoon 2 by shifting the position of floating dredge 35. Submerged conduit 48 can be rigid or semi-rigid so that cutter head 49 shifts along with floating dredge 35. Alternatively, the position of cutter head 49 can be controlled independent of floating dredge 35 by conventional means.

In operation, the illustrated lagoon 2 is remediated using the following process. In the example illustrated in FIG. 2, an area 60 of the ground adjacent lagoon 2 is formed or sculpted to form an inclined bed 61 to support dewatering membrane 3. Bed 61 is inclined or angled downwardly toward the upper surface 16 of lagoon 2, such that gravitational forces will drain clear liquid effluent from dewatering membrane 3 back into lagoon 2. Preferably, a sheet 62 of flexible, imperforate material, constructed from polyethylene or the like, is placed on top of the ground of inclined bed 61 to prevent seepage of the effluent into the adjacent ground. Furthermore, an, earthen berm 63 may be formed around the perimeter of bed 61 to ensure that the effluent drains back into lagoon 2.

At least one dewatering membrane 3 is positioned on top of sheet 62 in bed 61. In the illustrated example, the four geotextile tubes 20–23 are arranged in a generally parallel relationship along the length of bed 61, and have their inlet ports 26 interconnected by header 27. A conventional drain bed (not shown) made from sand, gravel and/or other similar aggregates or like materials may be provided between sheet 62 and geotextile tubes 20–23 to insure complete drainage of water from dewatering membrane 3.

Floating dredge 35 is then positioned over the bottom 6 of lagoon 2 using rigging 36 and capstan 37, thereby locating cutter head 49 at the area at which sludge 4 is to be removed. Floating dredge 35 may be equipped with an on-board operating station (not shown), so that dredge 35 can be controlled by an operator riding on dredge 35. Pump 45 is then activated, creating a suction which, along with agitator 57, draws sludge 4 and the adjacent water 5 through cutter head 49 and mixes the same into sludge slurry 7. Skids 56 position cutter head 49 at the desired location adjacent the bottom 6 of lagoon 2 to maximize intake of sludge 4. Agitator 57 ensures that debris within sludge 4 will not clog the cutter head 49 or associated transport tube 48, and also serves to mix water 5 with sludge 4.

In order to accelerate dewatering, a flocculating polymer, such as a polyelectrolyte, is injected into pump 45 to enhance the freeing of bound water. The flocculating polymer mixes in the sludge slurry 7 and thickens the same as it is transported through outlet tube 50 into dewatering tubes 20–23. In the illustrated example, flocculating polymer is stored in a container 68 located on dredge 35 adjacent pump 45, and injects the polymer directly into pump 45.

The sludge slurry 7 with flocculating polymer mixed therein is preferably pumped into the interior of geotextile tubes 20–23 under pressure, so as to accelerate the dewatering process. Geotextile tubes 20–23 are filled lengthwise with the sludge slurry 7 and flocculating polymer under pressure until they are completely filled. During the filling process, water is forced under pressure through geotextile tubes 20–23, thereby capturing solid particles within the interior of the tubes 20–23. Once geotextile tubes 20–23 are completely filled, pump 45 is deactivated, tube 50 and header 27 are removed, and the inlet ports 26 are sealed closed. The filled geotextile tubes 20–23 have a rounded or generally pillow-like shape, which serves to shed rainwater, snow and other moisture. The tight weave of the geotextile material, along with the rounded shape of the filled tubes 20–23, prevent any significant moisture from entering the interior of tubes 20–23, thereby assisting in the complete and rapid dewatering of sludge 4.

The sludge slurry 7 in filled geotextile tubes 20–23 is then dewatered by allowing gravitational forces to flow the water in the sludge slurry 7 through the semi-permeable geotextile material of tubes 20–23. The angled orientation of bed 61, as well as flocculating polymer, serve to accelerate the dewatering process, such that clear liquid effluent is decanted from dewatering membrane 3, and drains back into lagoon 2.

The forces of nature, including wind, also serve to dry the sludge residuals. Preferably, geotextile tubes 20–23, which contain the trapped residuals, are allowed to remain undisturbed over time through several seasons. Cold wintertime conditions cause freezing of the residuals. The natural ice crystal formation pierces intact bacterial cells, thereby allowing additional water to be freed from the cell structures. Upon thawing, under warm springtime conditions, free water is pulled from the cylindrically shaped geotextile tubes 20–23 through the forces of gravity. The black color of geotextile tubes 20–23 absorbs UV radiation and heats the sludge 4 to facilitate the dewatering process.

Once the geotextile tubes 20–23 have been completely dewatered, the final step in the process is to open the dewatering membrane 3, and remove the contents either for use as an agricultural soil amendment, or for disposition to an appropriate dumpsite. In the example shown in FIG. 4, an earth mover or front loader 70 is shown loading dewatered sludge 8 into a dump truck 71.

An alternate embodiment of the present invention is provided for sites where it is not desirable and/or feasible to have the water effluent from dewatering membrane 3 flow directly back into lagoon 2. In such situations, bed 61 may be equipped with a sump (not shown) from which effluent water can be pumped to the desired location.

The present invention can also be used in treatment facilities for potable water, industrial waste and other similar liquids. Sludge or other sediment is removed from the holding area, such as a basin, treatment vessel, lagoon, etc. by pumping the same into dewatering membranes in the manner described above.

The present invention provides a very cost effective, timesaving and environmentally sensitive method for removing sludge from water holding areas and the like. Since the water over the sludge is not removed, the process is non-invasive, and the adverse ecological effects of odor and the like are avoided. The dewatering of the sludge slurry is quite complete, thereby greatly reducing the volume of solid sludge that must be transported to an appropriate disposal site. Furthermore, the water treatment area can be operating during the remediation process, so as to result in substantial cost savings.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A method for remediating wastewater lagoons and the like of the type having a bottom with sludge deposited thereon and water over the sludge which defines an upper surface of an associated lagoon, comprising the steps of:

forming a closed foraminous dewatering membrane configured to dewater a sludge slurry therein;

positioning the dewatering membrane adjacent to the lagoon at an elevation above the elevation of the upper surface of the lagoon;

pumping the sludge and adjacent water from the bottom of the lagoon to form a sludge slurry;

mixing a flocculating polymer into the sludge slurry to improve dewatering;

discharging the sludge slurry mixed with the flocculating polymer into the interior of the dewatering membrane;

removing the water from the sludge slurry by allowing gravitational forces to flow water through the dewatering membrane back into the lagoon;

opening the dewatering membrane; and removing the dewatered sludge from the opened dewatering membrane.

2. A method as set forth in claim 1, wherein:

said water removing step includes pressurizing the sludge slurry in the dewatering membrane to accelerate dewatering.

3. A method as set forth in claim 2, wherein:

said mixing step is performed prior to said discharging step.

4. A method as set forth in claim 3, wherein:

said forming step includes forming from a geotextile material at least one closed elongate tube having at least one fill port therein to define the dewatering membrane.

5. A method as set forth in claim 4, wherein:

said tube forming step includes stitching together sheets of geotextile material.

6. A method as set forth in claim 5, wherein:

said water removing step includes freezing and subsequently thawing the filled dewatering membrane prior to said opening step.

7. A method as set forth in claim 6, wherein:

said pumping step includes contemporaneously sucking and agitating the sludge.

8. A method as set forth in claim 7, wherein:

said pumping step includes:

providing a tube with a cutter head at the free end thereof through which the sludge slurry is pumped; and shifting the cutter head along the bottom of the lagoon to remove the sludge.

9. A method as set forth in claim 1, wherein:

said mixing step is performed prior to said discharging step.

10. A method as set forth in claim 1, wherein:

said forming step includes forming from a geotextile material at least one closed elongate tube having at least one fill port therein to define the dewatering membrane.

11. A method as set forth in claim 10, wherein:

said tube forming step includes stitching together sheets of geotextile material.

12. A method as set forth in claim 1, wherein:

said water removing step includes freezing and subsequently thawing the filled dewatering membrane prior to said opening step.

13. A method as set forth in claim 1, wherein:

said pumping step includes contemporaneously sucking and agitating the sludge.

14. A method as set forth in claim 13, wherein:

said pumping step includes:

providing a tube with a cutter head at the free end thereof through which the sludge slurry is pumped; and shifting the cutter head along the bottom of the lagoon to remove the sludge.

15. A method for remediating wastewater lagoons and the like of the type having a bottom with sludge deposited thereon and water over the sludge which defines an upper surface of an associated lagoon, comprising the steps of:

forming a closed foraminous dewatering membrane configured to dewater a sludge slurry therein;

positioning the dewatering membrane adjacent to the lagoon at an elevation above the elevation of the upper surface of the lagoon;

pumping the sludge and adjacent water from the bottom of the lagoon to form a sludge slurry;

discharging the sludge slurry into the interior of the dewatering membrane;

removing the water from the sludge slurry by allowing gravitational forces to flow water through the dewatering membrane back into the lagoon;

opening the dewatering membrane;

removing the dewatered sludge from the opened dewatering membrane; and wherein said pumping step includes contemporaneously sucking and agitating the sludge; and said pumping step includes providing a tube with a cutter head at the free end thereof through which the sludge slurry is pumped, and shifting the cutter head along the bottom of the lagoon to remove the sludge.

16. A method as set forth in claim 15, wherein:

said water removing step includes pressurizing the sludge slurry in the dewatering membrane to accelerate dewatering.

17. A method as set forth in claim 15, including:

mixing a flocculating polymer into the sludge slurry to improve dewatering.

18. A method as set forth in claim 17, wherein:

said mixing step is performed prior to said discharging step.

19. A method as set forth in claim 15, wherein:

said forming step includes forming from a geotextile material at least one closed elongate tube having at least one fill port therein to define the dewatering membrane.

20. A method as set forth in claim 19, wherein:

said tube forming step includes stitching together sheets of geotextile material.

21. A method as set forth in claim 15, wherein:

said water removing step includes freezing and subsequently thawing the filled dewatering membrane prior to said opening step.

* * * * *